US009480247B2

(12) United States Patent
Beitler (10) Patent No.: US 9,480,247 B2
(45) Date of Patent: Nov. 1, 2016

(54) BUG CATCHING APPARATUS (71) Applicant: David Thomas Beitler, Taylors, SC (US)

(72) Inventor: David Thomas Beitler, Taylors, SC (US)

( * ) Notice: Subject to any disclaimer, the term of this patent is extended or adjusted under 35 U.S.C. 154(b) by 30 days.

(21) Appl. No.: 14/727,607

(22) Filed: Jun. 1, 2015

(65) Prior Publication Data
US 2015/0342170 A1 Dec. 3, 2015

Related U.S. Application Data (60) Provisional application No. 62/005,154, filed on May 30, 2014.

(51) Int. Cl.
*A01M 1/06* (2006.01)
*A01M 1/08* (2006.01)

(52) U.S. Cl.
CPC ....................... *A01M 1/08* (2013.01)

(58) Field of Classification Search
USPC ............... 43/139, 138, 113, 107, 133, 132.1
See application file for complete search history.

(56) References Cited

U.S. PATENT DOCUMENTS

| 738,184 | A | * | 9/1903 | Goodwin | 43/113 |
| 1,671,404 | A | * | 5/1928 | Cherry | A01M 1/08 15/339 |
| 1,807,550 | A | * | 5/1931 | Rector | A01M 1/08 43/139 |
| 2,893,161 | A | * | 7/1959 | Reid | A01M 1/08 43/113 |
| 4,141,173 | A | * | 2/1979 | Weimert | A01M 1/08 43/113 |
| 5,014,460 | A | * | 5/1991 | Patti | A01M 1/08 43/107 |
| 6,817,139 | B1 | * | 11/2004 | Powell | A01M 1/08 43/113 |
| 7,036,269 | B1 | * | 5/2006 | Chen | A01M 1/08 43/113 |
| 7,607,255 | B2 | * | 10/2009 | Hu | A01M 1/04 43/107 |
| 2004/0068917 | A1 | * | 4/2004 | Chan | A01M 1/08 43/113 |
| 2004/0181997 | A1 | * | 9/2004 | Lee | A01M 1/08 43/139 |
| 2007/0011940 | A1 | * | 1/2007 | Chen | A01M 1/02 43/113 |
| 2008/0168702 | A1 | * | 7/2008 | Jaffrey | A01M 1/023 43/111 |
| 2009/0277074 | A1 | * | 11/2009 | Noronha | A01M 1/08 43/113 |
| 2013/0064679 | A1 | * | 3/2013 | Tsai | A01M 1/06 416/247 R |
| 2015/0264913 | A1 | * | 9/2015 | Ganmor | A01M 5/08 43/139 |

* cited by examiner

*Primary Examiner* — Christopher P Ellis (57) ABSTRACT

An apparatus for controlling the bugs that swarm a light bulb consists of a centrifugal fan, a funnel, a light bulb, an electrical contact base, and a collection bin. The funnel is mounted adjacent the centrifugal fan and helps channel the airflow towards the centrifugal fan. A motor transfers rotational motion to the centrifugal fan. Both the motor and the light bulb are powered through the electrical contact base. The centrifugal fan directs the airflow towards the collection bin through an outlet duct. An impeller of the centrifugal fan opens an entrance of the collection bin. When the impeller is stationary, a trapdoor conceals the entrance. The collection bin is removably attached so that it can be removed according to user preference.

13 Claims, 12 Drawing Sheets

BUG CATCHING APPARATUS

The current application is a non-provisional application and claims a priority to the U.S. provisional patent application Ser. No. 62/005,154 filed on May 30, 2014. The current application is filed on Jun. 1, 2015 while May 30, 2015 was on a weekend.

FIELD OF THE INVENTION

The present invention relates generally to bug catching equipment. More specifically, the present invention is an apparatus that utilizes illumination to attract bugs and trap them in a filter.

BACKGROUND OF THE INVENTION

Outdoor lighting is a necessity with the increase in outdoor activities. Even though outdoor lighting is extremely beneficial, eliminating the large number of bugs that swarm outdoor lighting can be extremely stressful. A number of bug exterminating equipment are available to address the issue. Even though these bug exterminating equipment have a series of advantages, they can also have a series of disadvantages. Therefore, the effectiveness of these bug exterminating equipment is questionable.

A majority of the existing bug exterminating equipment function as an individual device. These devices can either be battery powered or powered through any other power source. The need to have a power unit dedicated to the apparatus can be disadvantageous especially when the amount of available power is limited or an appropriate power outlet is not available.

In most insect controlling equipment that utilize electricity, two wires with a high voltage are used to electrocute the insect upon contact. These devices are usually housed in a protective cage to prevent people or animals from touching the high voltage grid. However, if the device is not installed as recommended, the device can pose a significant threat to anyone in the vicinity of the device.

Financial disadvantages are also evident with the existing bug catching devices. As an example, if a large area is intended to be covered, having multiple bug catching devices in addition to the existing lighting fixtures can be financially disadvantageous to the user.

Flood lights which are large in size and have a greater coverage area, are commonly used to cover a large area with a minimum number of lights. However, the large light also attracts a large number of bugs which can be troublesome to the user.

The objective of the present invention is to address the aforementioned issues. In particular, the present invention is an apparatus that can be used to prevent bugs from swarming around a light source. The present invention eliminates the need to have a separate fixture since the present invention is integrated along with the lighting fixture. Moreover, the effective design of the present invention allows the present invention to be used with a variety of light fixtures that includes flood lights.

DETAIL DESCRIPTIONS OF THE INVENTION

All illustrations of the drawings are for the purpose of describing selected versions of the present invention and are not intended to limit the scope of the present invention.

The present invention is an apparatus for controlling bugs that swarm around a lighting fixture. The present invention directly connects to the power source of the lighting fixture. Therefore, the present invention provides a higher level of convenience when compared to the existing bug controlling devices. The present invention can be used with a wide variety of lighting fixtures that can be, but is not limited to flood lights.

Figure 1:
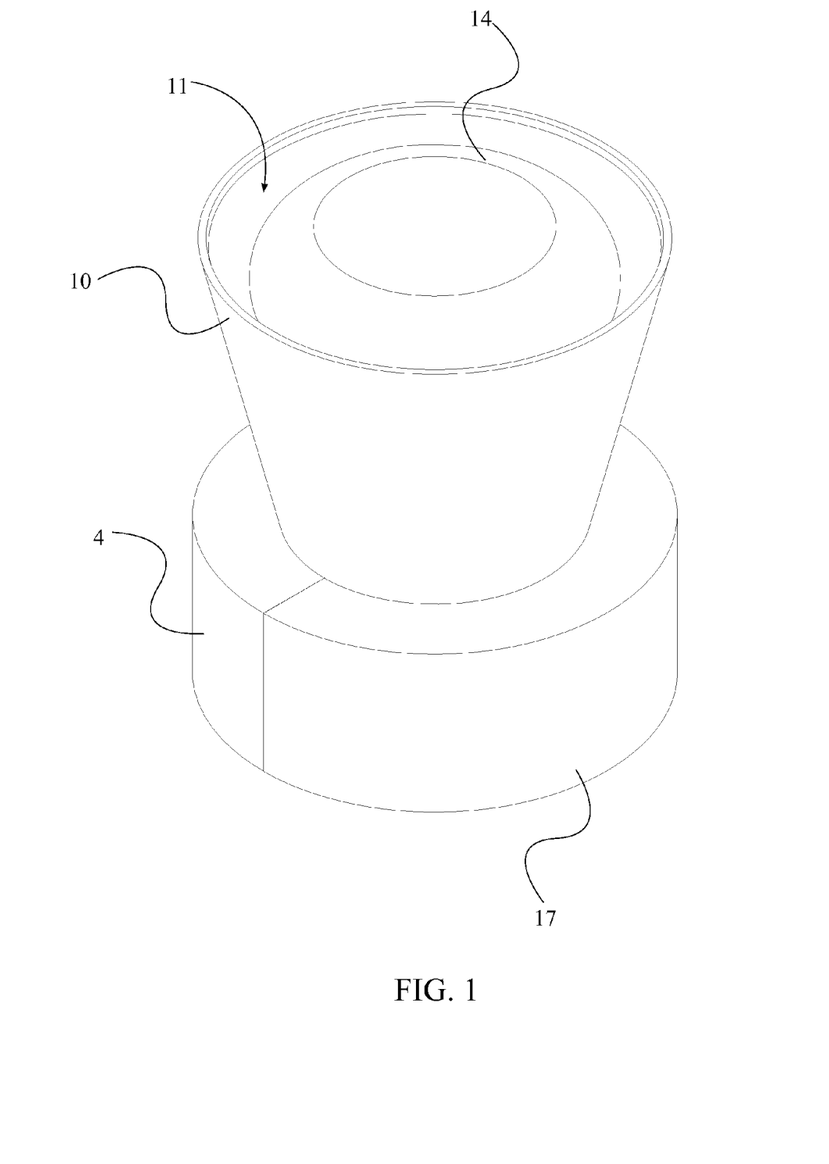
FIG. 1 is a perspective view of the present invention.
Figure 2:
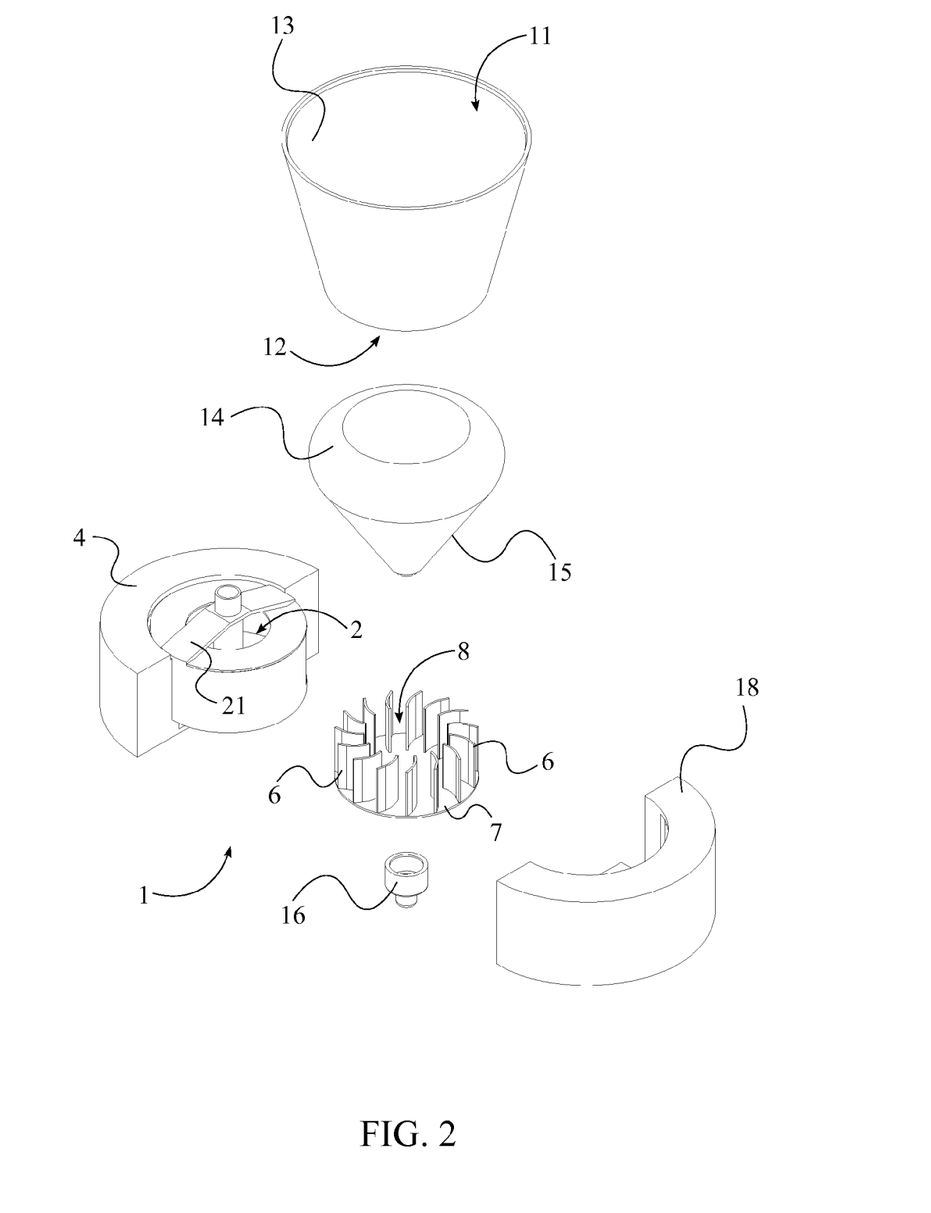
FIG. 2 is an exploded view of the present invention.

Heat and electrocution are some of the most renowned ways of controlling bugs that swarm around a lighting fixture. In contrast to these bug controlling devices, the present invention utilizes a method of suction which draws in the bugs that swarm the lighting fixture. As seen in FIG. 1 and FIG. 2, the present invention comprises a centrifugal fan 1, a funnel 10, a light bulb 14, an electrical contact base 16, and a collection bin 17. The centrifugal fan 1 creates an air flow that helps draw in the bugs that swarm around the light bulb 14. The funnel 10 creates a channel such that the centrifugal fan 1 can effectively draw in bugs from the air around the light bulb 14 and dispose the bugs in the collection bin 17. In order to do so, the funnel 10 is mounted adjacent to the centrifugal fan 1. Electrical power is supplied to the centrifugal fan 1 from the electrical contact base 16 which is mounted adjacent to the centrifugal fan 1 and opposite to the funnel 10.

In the preferred embodiment of the present invention, the funnel 10 is cone shaped. However, the funnel 10 can be differently shaped in other embodiments of the present invention. The cone shaped funnel 10 of the preferred embodiment of the present invention comprises a wide opening 11 and a narrow opening 12. When the funnel 10 is mounted adjacent to the centrifugal fan 1, the narrow opening 12 is positioned adjacent to an inlet duct 2 of the centrifugal fan 1. The funnel 10 is in fluid communication into the inlet duct 2 around light bulb 14. More specifically, an annular fluid passage is formed between an inner lateral surface 13 of the funnel 10 and an outer lateral surface 15 of the light bulb 14 such that the air around the light bulb 14 is constantly drawn into the inlet duct 2. The light bulb 14 is centrally mounted within the funnel 10 and is positioned in between the wide opening 11 and the narrow opening 12. As a result, all bugs in considerably close proximity to the light bulb 14 are also trapped in between the wide opening 11 and the narrow opening 12. The position of the funnel 10 with respect to the light bulb 14 is essential to capture a majority of the bugs. Preferably, the funnel 10 is made of a transparent material such that the coverage area of the light bulb 14 is not hindered when the present invention is in use.

Figure 5:
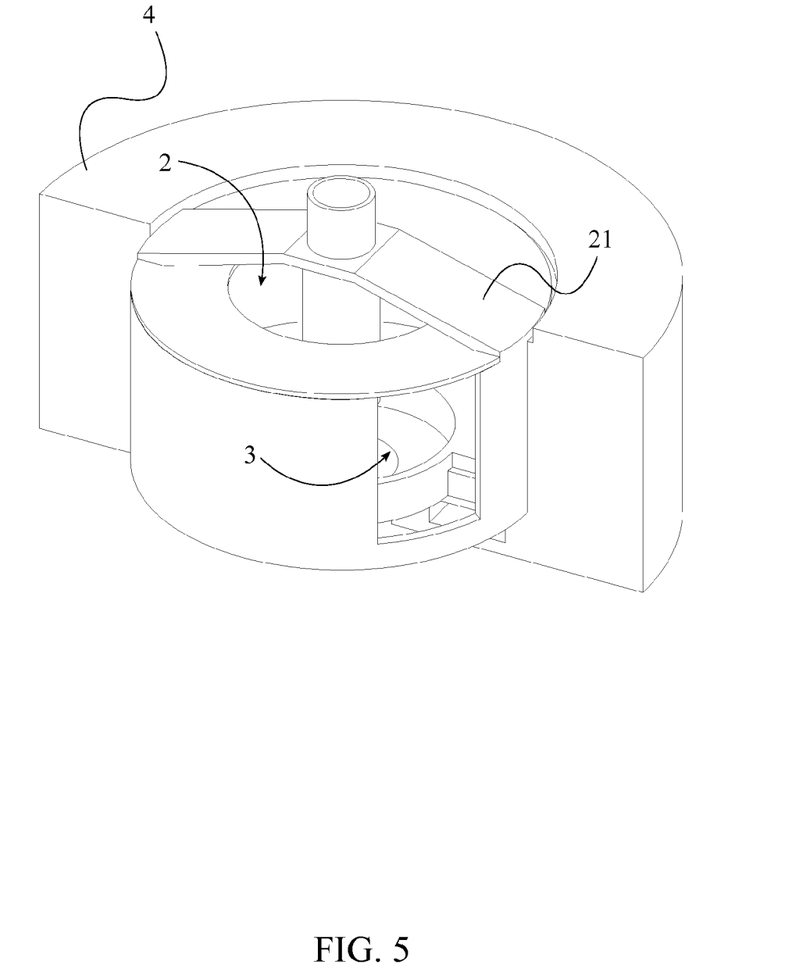
FIG. 5 is a perspective view of housing of the centrifugal fan.
Figure 6:
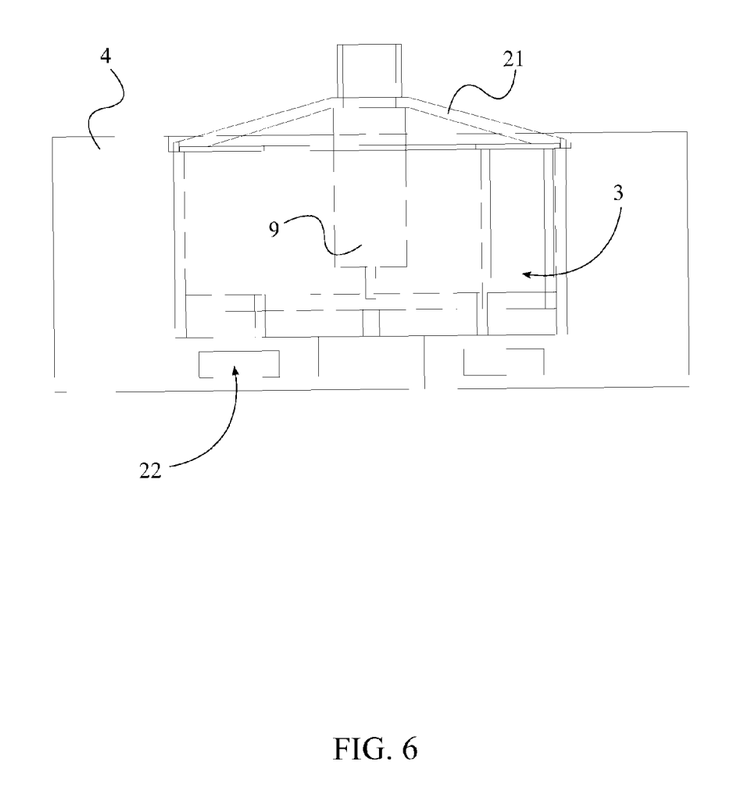
FIG. 6 is a side view of the housing of the centrifugal fan.
Figure 10:
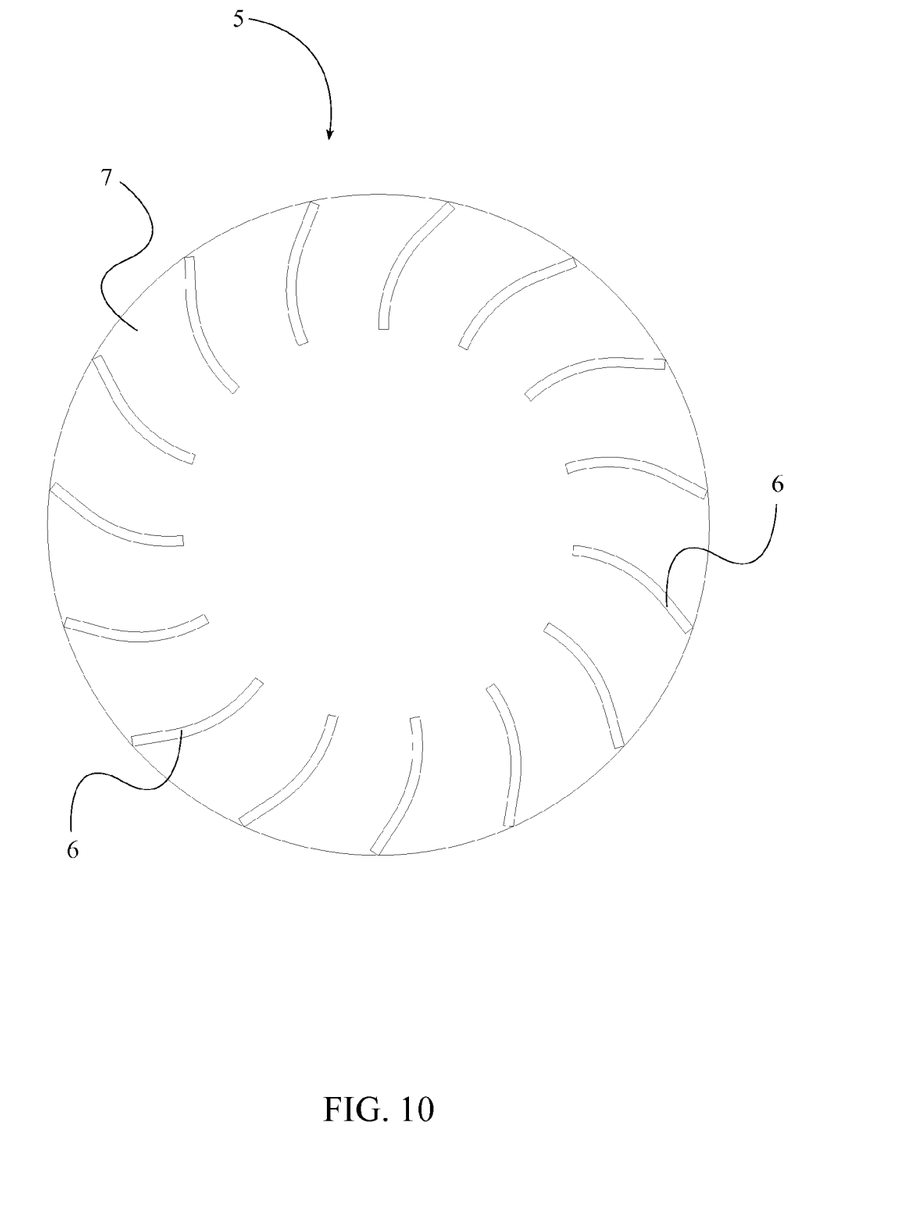
FIG. 10 is a top view of the impeller.
Figure 11:
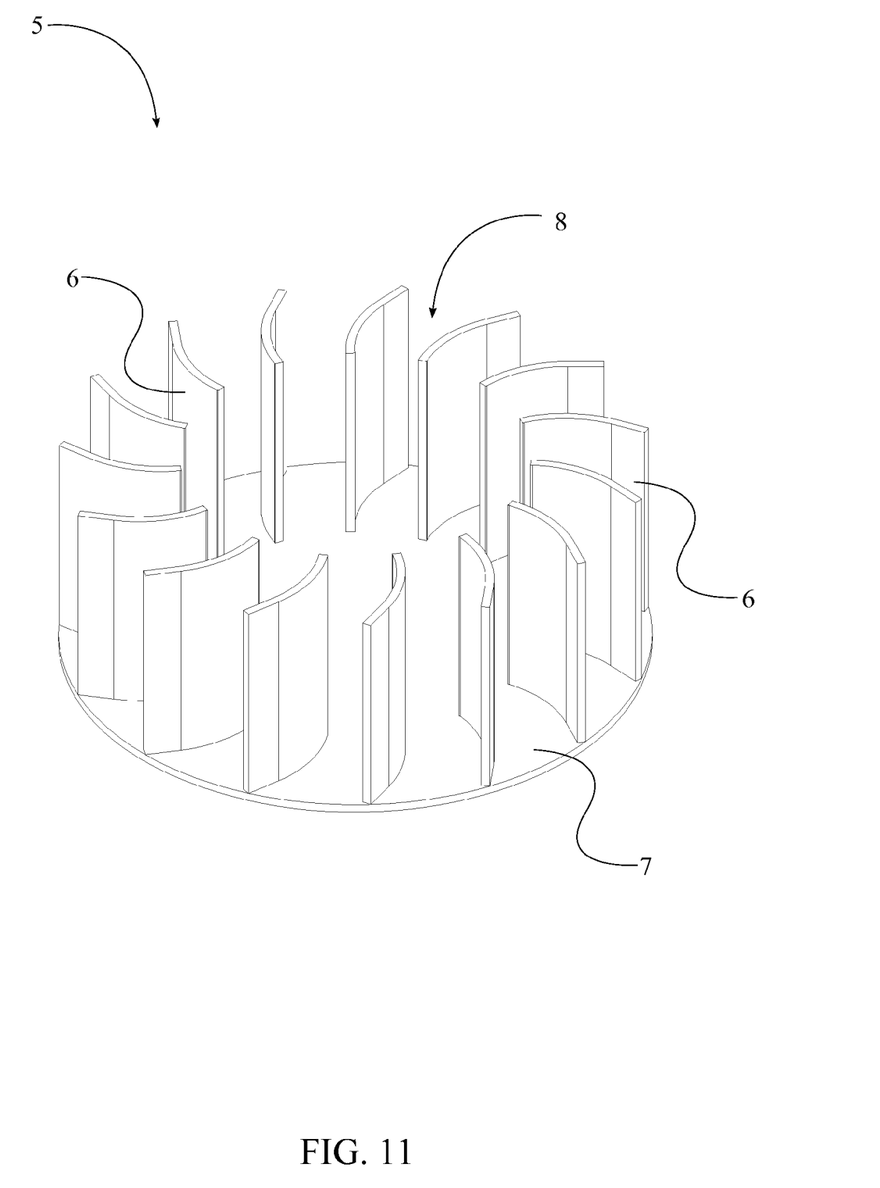
FIG. 11 is a perspective view of the impeller.
Figure 12:
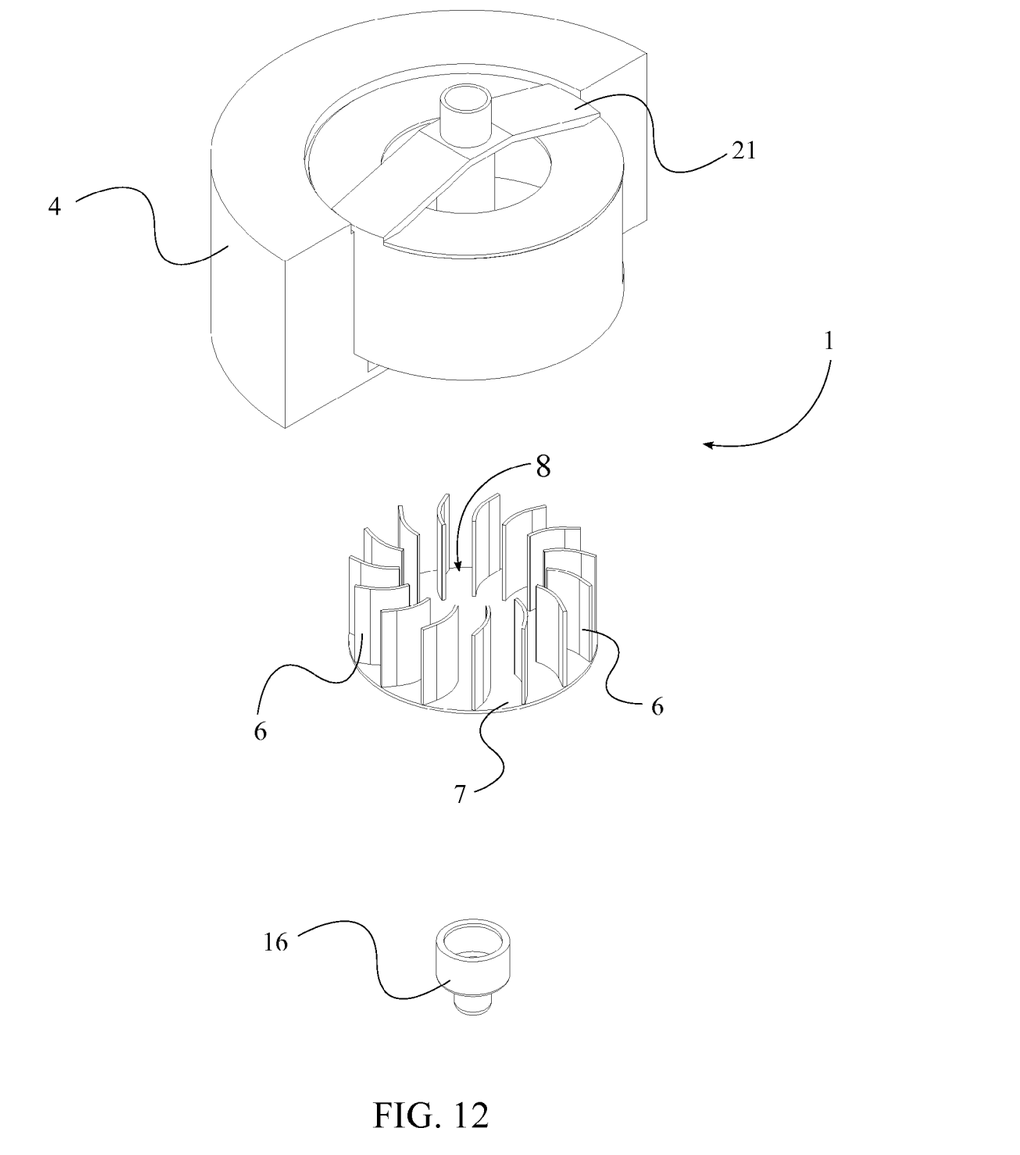
FIG. 12 is an exploded view of the centrifugal fan and the electrical contact base.

As previously discussed, the bugs swarming the light bulb 14 are drawn in through the air flow created by the centrifugal fan 1. In addition the to the inlet duct 2, the centrifugal fan 1 comprises an outlet duct 3, a housing 4, an impeller 5, and a motor 9 as seen in FIG. 5, FIG. 6 and FIG. 12. The outlet duct 3 acts as an exit point for the air coming in through the inlet duct 2. The impeller 5 is rotatably mounted within the housing 4. The impeller 5 comprises a plurality of vanes 6, a structural plate 7, and a cylindrical space 8 as shown in FIG. 10 and FIG. 11. The plurality of vanes 6 is utilized to push the air flow radially. In particular, the rotational motion of the plurality of vanes 6 direct the air flow from the inlet duct 2 towards the outlet duct 3. In order to do so, the plurality of vanes 6 is radially positioned about the cylindrical space 8, and is perpendicularly connected onto the structural plate 7. The inlet duct 2 traverses through the housing 4 and into the cylindrical space 8 and the outlet duct 3 traverses through the housing 4 adjacent to the plurality of vanes 6. Resultantly, air flow is received at the inlet duct 2, and redirected in a perpendicular path towards the outlet duct 3 by the plurality of vanes 6. The motor 9 which transfers rotational motion to the impeller 5, is centrally mounted within the cylindrical space 8 as shown in FIG. 6. In order to create a contact point between the motor 9 and the impeller 5, the motor 9 is torsionally coupled to the structural plate 7. As a result, the motor 9 spins the structural plate 7 in order to rotate the plurality of vanes 6. The electrical contact base 16 is electrically connected to the motor 9 and the light bulb 14. Therefore, the motor 9 and the light bulb 14 are switched on or switched off simultaneously. If the present invention is powered through an alternating current (AC) power source as in the preferred embodiment of the present invention, the motor 9 is an AC motor. However, in another embodiment of the present invention, a direct current (DC) motor can also be utilized with an AC to DC converter electrically connected in series to the motor 9.

In order to obtain the best results, the centrifugal fan 1 and the light bulb 14 need to be in close proximity to each other. As seen in FIG. 5 and FIG. 6, the present invention comprises a support bridge 21 to position the light bulb 14 adjacent to the centrifugal fan 1. The support bridge 21 is mounted to the centrifugal fan 1 across the inlet duct 2. Moreover, the support bridge 21 is angled to ensure that the support bridge 21 causes minimum obstruction to the air flow. The light bulb 14 is mounted adjacent to the support bridge 21. The motor 9 is also positioned adjacent to the support bridge 21 and opposite to the light bulb 14. Since the motor 9 is connected to the centrifugal fan 1, the support bridge 21 helps positions the centrifugal fan 1 and the light bulb 14 adjacent to each other.

Figure 3:
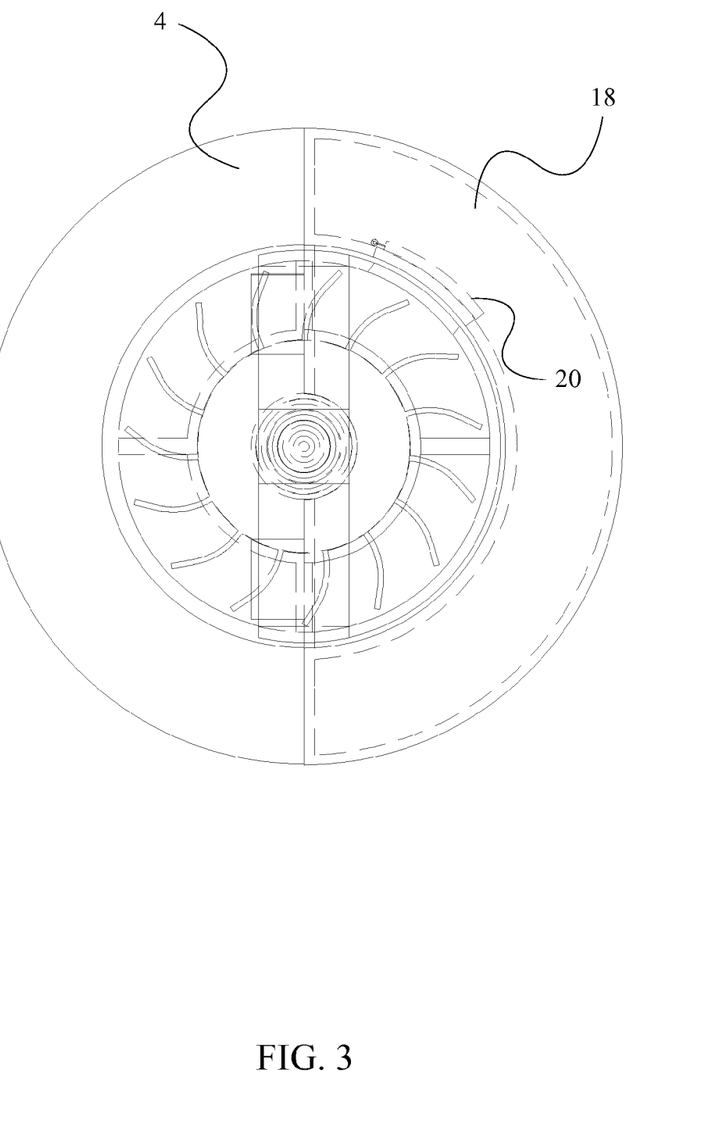
FIG. 3 is a top view illustrating the centrifugal fan and the collection bin, wherein the trapdoor is closed.
Figure 4:
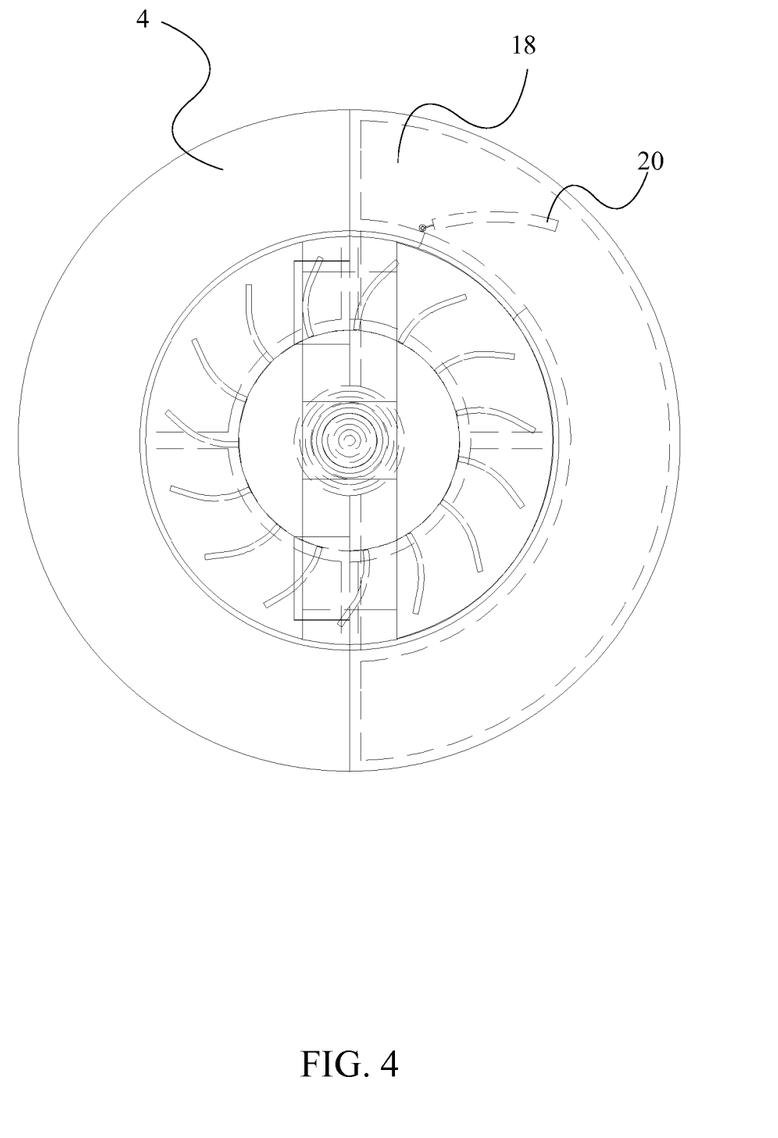
FIG. 4 is a top view illustrating the centrifugal fan and the collection bin, wherein the trapdoor is open.
Figure 7:
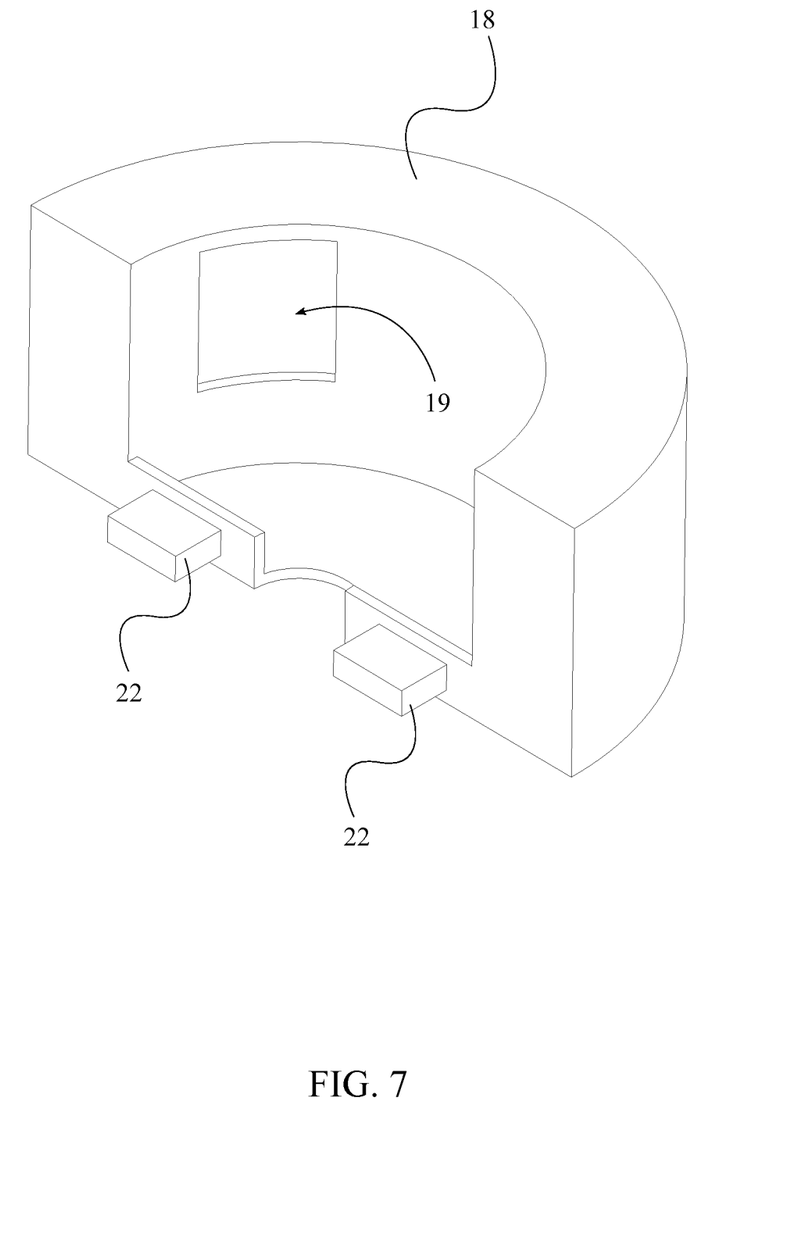
FIG. 7 is a perspective view of the collection bin.
Figure 8:
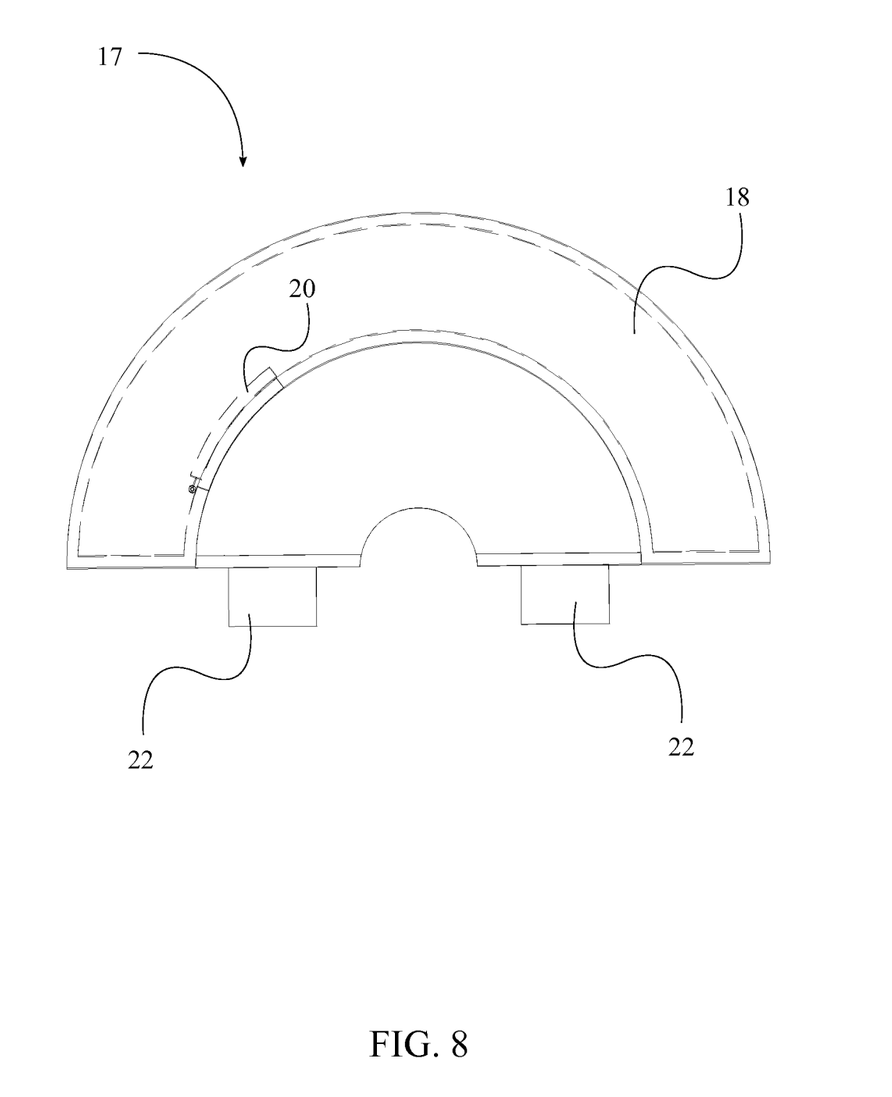
FIG. 8 is a top view of the collection bin, wherein the trapdoor is closed.
Figure 9:
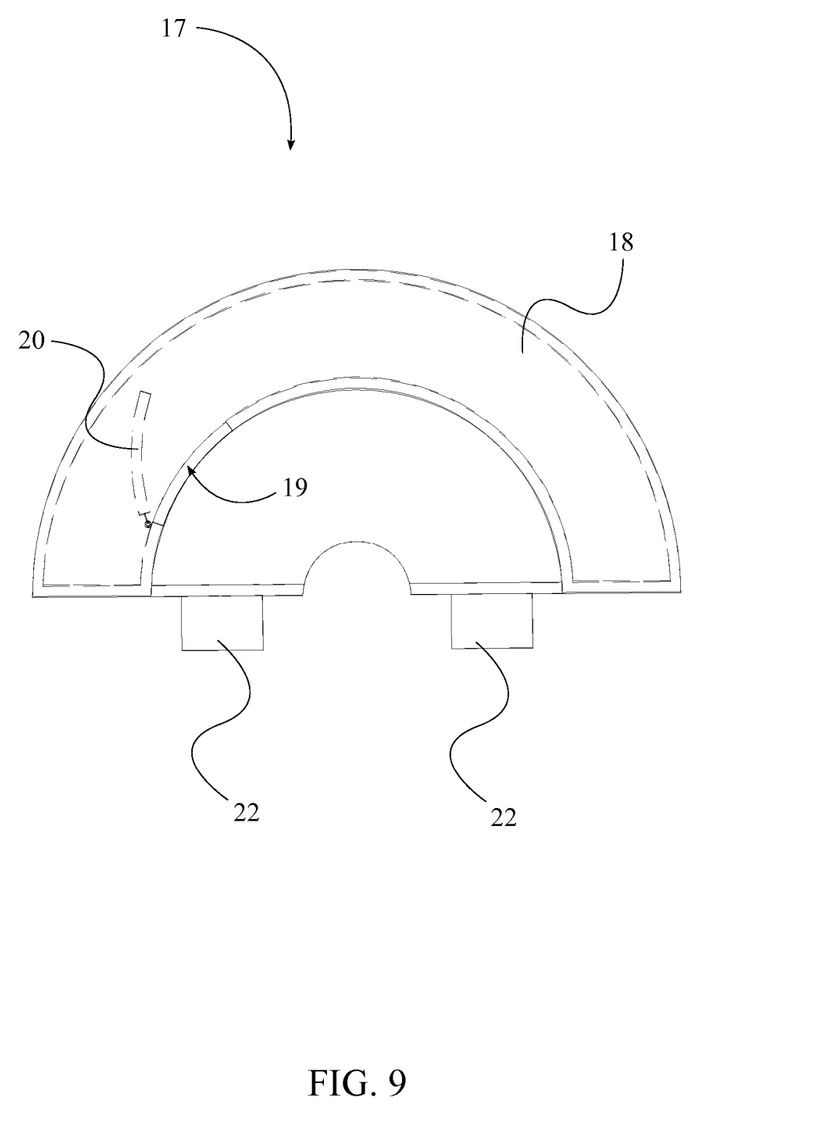
FIG. 9 is a top view of the collection bin, wherein the trapdoor is open.

The collection bin 17 shown in FIG. 7-9 is utilized to trap the bugs that are drawn in by the centrifugal fan 1. In order to do so, the outlet duct 3 is in fluid communication into the collection bin 17. The positioning of the housing 4 and the enclosure are illustrated in FIG. 3 and FIG. 4. For user convenience, the collection bin 17 is removably mounted to the centrifugal fan 1 in between the funnel 10 and the electrical contact base 16. The removable attachment allows the user to detach the collection bin 17 without disassembling the entire apparatus. The collection bin 17 comprises an enclosure 18, an entrance 19, and a trapdoor 20. The enclosure 18 is laterally positioned about the centrifugal fan 1 and is C-shaped in the preferred embodiment of the present invention. The entrance 19 traverses into the enclosure 18 and is positioned adjacent to the outlet duct 3. Proper positioning of the entrance 19 with respect to the outlet duct 3 is essential to ensure that the airflow directly travels into the enclosure 18. The trapdoor 20 controls the opening of the entrance 19. In order to do so, the trapdoor 20 is hingedly connected within the enclosure 18, adjacent to the entrance 19. When the plurality of vanes 6 start rotating, the rotation motion causes the air flow to push open the trapdoor 20. Resultantly, the air flow enters the enclosure 18. When the plurality of vanes 6 is stationary, the trapdoor 20 remains closed since a force to push open the trapdoor 20 does not exist.

As discussed earlier, the collection bin 17 is removably mounted in between the funnel 10 and the electrical contact base 16. An interlocking mechanism 22 of the present invention allows the collection bin 17 to be removably mounted adjacent the centrifugal fan 1. However, different attachment methods can be used in different embodiments of the present invention.

In utilizing the present invention, the following process flow is followed. Initially, the present invention is attached to a light bulb holder. In doing so, the electrical contact base 16 is screwed into or mounted into the light bulb holder. The connection between the light bulb holder and the electrical contact base 16, electrically connects the motor 9 and the light bulb 14 to the power source providing power to the light bulb holder. When the power source is turned on, the motor 9 and the light bulb 14 are simultaneously switched on. Moreover, the centrifugal fan 1 is also activated since the motor 9 is electrically connected to the centrifugal fan 1. The redirected air flow helps open the trapdoor 20 such that the air drawn in is pushed towards the enclosure 18. The bugs in close proximity to the light bulb 14 are also pushed towards the enclosure 18 along with the air flow. When the enclosure 18 is full, the user can conveniently detach the collection bin 17 by utilizing the interlocking mechanism 22.

Although the invention has been explained in relation to its preferred embodiment, it is to be understood that many other possible modifications and variations can be made without departing from the spirit and scope of the invention as hereinafter claimed.

What is claimed is:
1. An apparatus for controlling bugs around a light fixture comprises:
   a centrifugal fan;
   a funnel;
   a light bulb;
   an electrical contact base;
   a collection bin;
   the centrifugal fan comprises an inlet duct and an outlet duct;
   the funnel being mounted adjacent to the centrifugal fan;
   the electrical contact base being mounted adjacent to the centrifugal fan, opposite to the funnel;
   the collection bin being removably mounted adjacent to the centrifugal fan in between the funnel and the electrical contact base;
   the light bulb being centrally mounted within the funnel;
   the funnel being in fluid communication into the inlet duct around the light bulb;
   the outlet duct being in fluid communication into the collection bin; and
   the electrical contact base being electrically connected to a motor of the centrifugal fan and the light bulb.
2. The apparatus for controlling bugs around a light fixture as claimed in claim 1 comprises:

the funnel comprises a wide opening and a narrow opening;

the narrow opening being positioned adjacent to the inlet duct;

the light bulb being positioned in between the wide opening and the narrow opening; and an annular fluid flow passage being formed between an inner surface of the funnel and an outer lateral surface of the light bulb.

3. The apparatus for controlling bugs around a light fixture as claimed in claim 1 comprises:

the centrifugal fan comprises a housing, an impeller, and a motor;

the impeller comprises a plurality of vanes, a structural plate, and a cylindrical space;

the plurality of vanes being radially positioned about the cylindrical space;

the plurality of vanes being perpendicularly connected onto the structural plate;

the impeller being rotatably mounted within the housing;

the inlet duct traversing through the housing and into the cylindrical space;

the outlet duct traversing through the housing, adjacent to the plurality of vanes;

the motor being centrally mounted within the cylindrical space; and the motor being torsionally coupled to the structural plate, wherein the motor spins the structural plate in order to rotate the plurality of vanes.

4. The apparatus for controlling bugs around a light fixture as claimed in claim 3, wherein the electrical contact base being electrically connected to the motor.

5. The apparatus for controlling bugs around a light fixture as claimed in claim 1 comprises:

a support bridge;

the support bridge being mounted to the centrifugal fan across the inlet duct;

the light bulb being mounted adjacent to the support bridge; and a motor of the centrifugal fan being mounted adjacent to the support bridge, opposite to the light bulb.

6. The apparatus for controlling bugs around a light fixture as claimed in claim 1 comprises:

the collection bin comprises an enclosure, an entrance, and a trapdoor;

the enclosure being laterally positioned about the centrifugal fan;

the entrance traversing into the enclosure, adjacent to the outlet duct; and the trapdoor being hingedly connected within the enclosure, adjacent to the entrance.

7. The apparatus for controlling bugs around a light fixture as claimed in claim 1 comprises:

an interlocking mechanism; and the collection being removably mounted adjacent to the centrifugal fan by the interlocking mechanism.

8. An apparatus for controlling bugs around a light fixture comprises:

a centrifugal fan;

a funnel;

a light bulb;

an electrical contact base;

a collection bin;

the centrifugal fan comprises an inlet duct and an outlet duct;

the funnel being mounted adjacent to the centrifugal fan;

the electrical contact base being mounted adjacent to the centrifugal fan, opposite to the funnel;

the collection bin being removably mounted adjacent to the centrifugal fan in between the funnel and the electrical contact base;

the light bulb being centrally mounted within the funnel;

the funnel being in fluid communication into the inlet duct around the light bulb;

the outlet duct being in fluid communication into the collection bin;

the electrical contact base being electrically connected to a motor of the centrifugal fan and the light bulb;

the funnel comprises a wide opening and a narrow opening;

the narrow opening being positioned adjacent to the inlet duct;

the light bulb being positioned in between the wide opening and the narrow opening; and an annular fluid flow passage being formed between an inner surface of the funnel and an outer lateral surface of the light bulb.

9. The apparatus for controlling bugs around a light fixture as claimed in claim 1 comprises:

the centrifugal fan comprises a housing, an impeller, and a motor;

the impeller comprises a plurality of vanes, a structural plate, and a cylindrical space;

the plurality of vanes being radially positioned about the cylindrical space;

the plurality of vanes being perpendicularly connected onto the structural plate;

the impeller being rotatably mounted within the housing;

the inlet duct traversing through the housing and into the cylindrical space;

the outlet duct traversing through the housing, adjacent to the plurality of vanes;

the motor being centrally mounted within the cylindrical space; and the motor being torsionally coupled to the structural plate, wherein the motor spins the structural plate in order to rotate the plurality of vanes.

10. The apparatus for controlling bugs around a light fixture as claimed in claim 9, wherein the electrical contact base being electrically connected to the motor.

11. The apparatus for controlling bugs around a light fixture as claimed in claim 8 comprises:

a support bridge;

the support bridge being mounted to the centrifugal fan across the inlet duct;

the light bulb being mounted adjacent to the support bridge; and a motor of the centrifugal fan being mounted adjacent to the support bridge, opposite to the light bulb.

12. The apparatus for controlling bugs around a light fixture as claimed in claim 8 comprises:

the collection bin comprises an enclosure, an entrance, and a trapdoor;

the enclosure being laterally positioned about the centrifugal fan;

the entrance traversing into the enclosure, adjacent to the outlet duct; and the trapdoor being hingedly connected within the enclosure, adjacent to the entrance.

13. The apparatus for controlling bugs around a light fixture as claimed in claim 8 comprises:
- an interlocking mechanism; and
- the collection being removably mounted adjacent to the centrifugal fan by the interlocking mechanism.

\* \* \* \* \*